United States Patent [19]
Wulf

[11] Patent Number: 5,118,188
[45] Date of Patent: Jun. 2, 1992

[54] ILLUMINATING ARRANGEMENT FOR ILLUMINATING A PHOTOMULTIPLIER IN A DOUBLE-BEAM PHOTOMETER

[75] Inventor: Jurgen Wulf, Uberlingen, Fed. Rep. of Germany

[73] Assignee: Bodenseewerk Perkin Elmer GmbH, Uberlingen, Fed. Rep. of Germany

[21] Appl. No.: 661,731

[22] Filed: Feb. 26, 1991

[30] Foreign Application Priority Data

Mar. 23, 1990 [DE] Fed. Rep. of Germany ....... 4009334

[51] Int. Cl.⁵ .................................................. G01J 3/02
[52] U.S. Cl. .................................... 356/323; 356/325; 356/408; 356/434; 356/448
[58] Field of Search ............... 356/319, 320, 323, 324, 356/325, 434, 447, 448, 408

[56] References Cited

U.S. PATENT DOCUMENTS

| | | | |
|---|---|---|---|
| 3,749,497 | 7/1973 | Kuzmin | 356/325 |
| 3,922,091 | 11/1975 | Suva et al. | 356/325 |
| 4,444,499 | 4/1984 | Akiyama et al. | 356/325 |

FOREIGN PATENT DOCUMENTS

| | | | |
|---|---|---|---|
| 48504 | 4/1985 | European Pat. Off. | 356/325 |
| 1068884 | 5/1967 | United Kingdom | 356/325 |

Primary Examiner—F. L. Evans
Attorney, Agent, or Firm—Edwin T. Grimes; Thomas P. Murphy

[57] ABSTRACT

A photomultiplier (10) with an elongated rectangular, cathode (20) tilted with respect to the inlet opening (14) is alternately illuminated by a measuring light beam (36) and a reference light beam (40). The measuring light beam (36) and the reference light beam (40) extend in a plane parallel to the longitudinal sides of the cathode (20) and impinge upon the cothode (20), such that they illuminate the same areas of the cathode (20).

1 Claim, 1 Drawing Sheet

ILLUMINATING ARRANGEMENT FOR ILLUMINATING A PHOTOMULTIPLIER IN A DOUBLE-BEAM PHOTOMETER

The patent application relates to an illumination arrangement for illuminating a photomultiplier with a measuring and a reference light beam in a double-beam photometer.

In a double-beam photometer, a measuring light beam and a reference light beam are alternately guided onto a photoelectric detector. The measuring light beam passes through a measuring path of rays in which a sample is arranged, and the reference light beam passes through a reference path of rays which does not contain a sample. Measuring and reference light beams generally have elongated rectangular beam cross sections. A photomultiplier often is used as detector. Such a photomultiplier typically has a housing with a rectangular, transparent inlet opening. A grid is arranged behind the inlet opening and essentially parallelly thereto. The grid defines a grid normal. An elongated rectangular cathode is located behind the grid. This cathode is arranged in a plane, which is rotated around an axis parallel to the longitudinal sides of the cathode relative to a plane perpendicular to the grid normal.

The longitudinal sides of the elongated rectangular beam cross sections should be parallel to the longitudinal sides of the cathode to optimally use the light of the measuring and reference beams. Then the whole measuring or reference light beam, respectively, impinges upon the cathode. The measuring light beam impinges upon the photomultiplier from another direction than the reference light beam. In prior art arrangements of this type, measuring and reference light beams with the beam axes extend in a horizontal reference plane, which extends perpendicularly to the longitudinal sides of the cathode approximately through the middle of the cathode. Thereby, the beam axes form equal angles of different signs with the grid normal. Measuring and reference light beams illuminate different areas of the cathode because of the inclination of the cathode. That results in differences in the sensitivity of the photomultiplier for measuring and reference light beams. The sensitivity of the cathode of the photomultiplier generally depends on the location of the illuminated spot on the cathode. Besides, the course of sensitivity as a function of the angle of incidence is more heavily curved in the reference plane than perpendicular thereto.

It is an object of the invention to provide an illumination arrangement of the type defined at the beginning, such that equal sensitivities result for the measuring and reference light beams.

According to the invention, this object is achieved in that the measuring light beam extends on one side of a reference plane extending perpendicularly to the longitudinal sides of the cathode and forms an angle through the middle of the cathode and forms an angle with the reference plane and the reference light beam extends on the other side of the reference plane and forms an angle oppositely equal to the angle of the measuring light beam with the reference plane, such that the measuring and reference light beam illuminate equal areas of the cathode.

Thus, the splitting of the beams occurs in a "vertical" plane perpendicular to the reference plane.

In such an arrangement, measuring and reference beams impinge upon the same area of the cathode.

Thereby, the cathode detects the whole beam cross sections. If the measuring and reference light beams were to be split conventionally in a "horizontal" plane extending perpendicular to the longitudinal sides of the beam cross sections and only the photomultiplier were to be rotated by 90°, then the longitudinal sides of the beams would extend parallel to the narrow sides of the cathode. The cathode would not detect the whole beam cross sections. An embodiment of the invention will now be described in greater detail with reference to the accompanying drawings.

Figure 1:
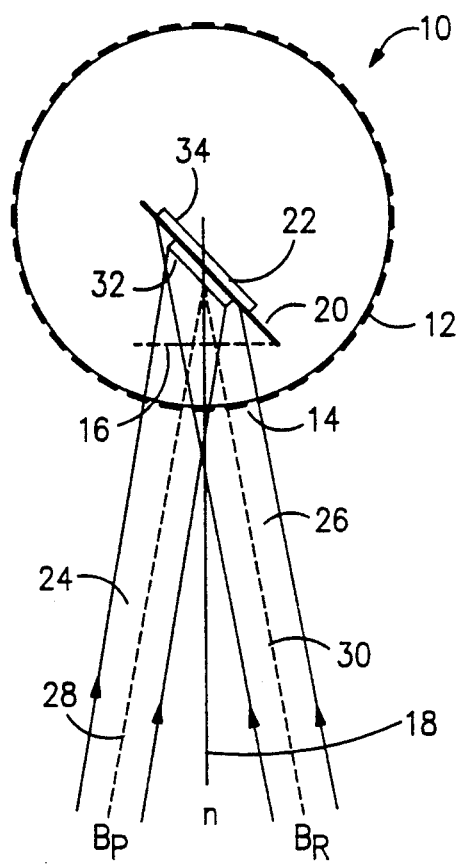
FIG. 1 shows an illumination arrangement according to the prior art in a horizontal section for a better understanding of the invention.

In FIG. 1, numeral 10 designates a photomultiplier. The photomultiplier has a generally cylindrical housing 12. The housing 12 has an elongated rectangular window 14. A grid 16 is located in the housing 12. The grid 16 is essentially parallel to the window 14. The grid 16 defines a grid normal 18 approximately in the middle of the window. The grid normal 18 is located in a reference plane, which approximately is formed by the paper plane in FIG. 1.

A cathode 20 is located behind the grid 16. The cathode 20 has elongated rectangular shape. The longitudinal sides of the cathode 20 extend perpendicular to the paper plane in FIG. 1. The cathode 20 is tilted about a (rotational) axis 22 extending parallel to the longitudinal sides of the cathode relative to a plane parallel to the grid 16 or to a plane perpendicular to the grid normal 18.

A measuring and a reference light beam 24 or 26, respectively, impinge alternately through the window 14 upon the cathode 20. In the illumination arrangement of the prior art illustrated in FIG. 1, the beam axes 28 and 30 of the measuring or reference light beams, respectively, both extend in the reference plane, i.e., in the paper plane of FIG. 1. They form oppositely equal angles with the grid normal 18 in this reference plane.

As can be seen from FIG. 1, different areas 32 or 34, respectively, of the cathode 20 are illuminated by the beam cross sections. Measuring and reference light beams are incident at different angles.

Figure 2:
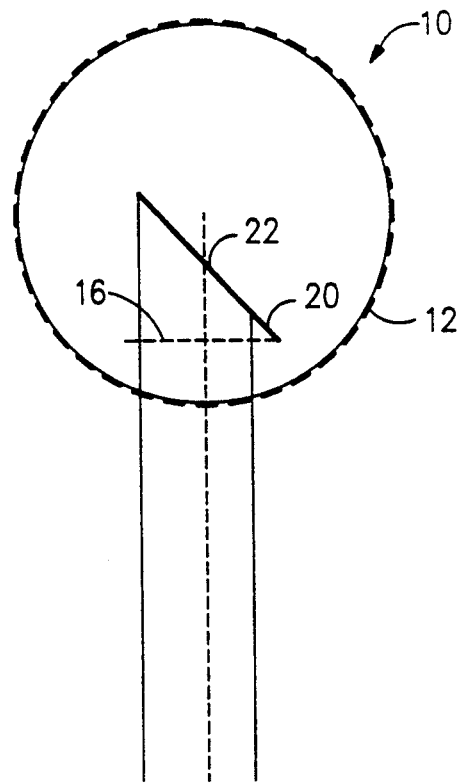
FIG. 2 shows a horizontal section of an illumination arrangement according to the invention.
Figure 3:
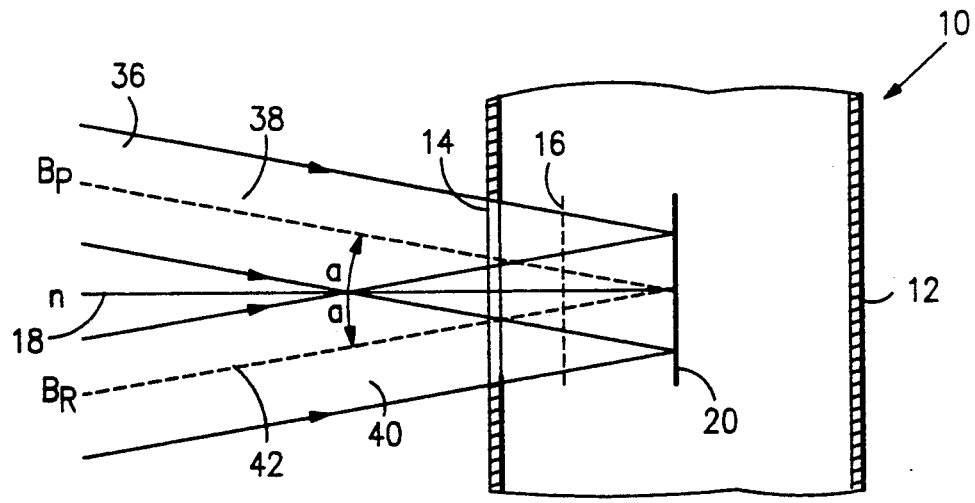
FIG. 3 shows a vertical section of the arrangement of FIG. 2.

In contrast to this, FIG. 2 and 3 show an illumination arrangement according to the invention. Corresponding elements bear the same reference numerals in FIG. 2 and 3 as in FIG. 1. Nothing is changed in respect to set up and arrangement of the photomultiplier 10. The measuring light beam 36 with the beam axis 38 is directed, such that it extends on the one upper side in FIG. 3 of the "horizontal" reference plane extending through the grid normal 18 and forms an angle $\alpha$ with the grid normal 18. The beam axis 38 is located in a "vertical" plane containing the grid normal and extending parallel to the longitudinal sides of the cathode 20. That is the paper plane of FIG. 3, which is perpendicular to the "horizontal" reference plane. The reference light beam 40 with the beam axis 42 is directed, such that it extends on the opposite, lower side of the reference plane in FIG. 3. The beam axis 42 of the reference light beam 40 forms also an angle $\alpha$ with the grid normal 18 to the other side. The beam axis 42 is also located in the "vertical" plane extending through the grid normal 18.

It can be seen from FIG. 3 that measuring and reference light beam 36 and 40 illuminate the same area of the cathode. They also fall upon the cathode at equal angles. It has been found that the different sensitivities of the photomultiplier 10 for the measuring light beam 36 and the reference light beam 40 can be avoided in this way.

I claim:

1. Illumination arrangement for illuminating a photomultiplier with a measuring and a reference light beam in a double-beam photometer, wherein (a) the photomultiplier (10) has a housing (12) with a rectangular inlet opening (14), a grid (16) essentially parallel to the inlet opening (14), which grid defines a grid normal, an elongated rectangular cathode (20) located behind the grid and arranged in a plane which is rotated about an axis parallel to the longitudinal sides of the cathode relative to a plane perpendicular to the grid normal (18), (b) the measuring and reference light beams (36, 40) have an elongated rectangular beam cross section, wherein the longitudinal side of the beam cross section extends essentially parallel to the longitudinal sides of the cathode (20) and (c) the measuring and reference light beams (36, 40) impinge upon the cathode from different directions, (d) the measuring light beam (36) forms an angle ($\alpha$) on one side of a reference plane extending perpendicular to the longitudinal sides of the cathode (20) and approximately through the middle of the cathode (20) and (e) the reference light beam (40) extends on the other side of the reference plane and forms an angle oppositely equal to the angle ($\alpha$) of the measuring light beam with the reference plane, such that the measuring and reference light beams illuminate equal areas of the cathode (20).

* * * * *